A. BREAER.
Car Wheel.
No. 10,983.
Patented May 30, 1854.
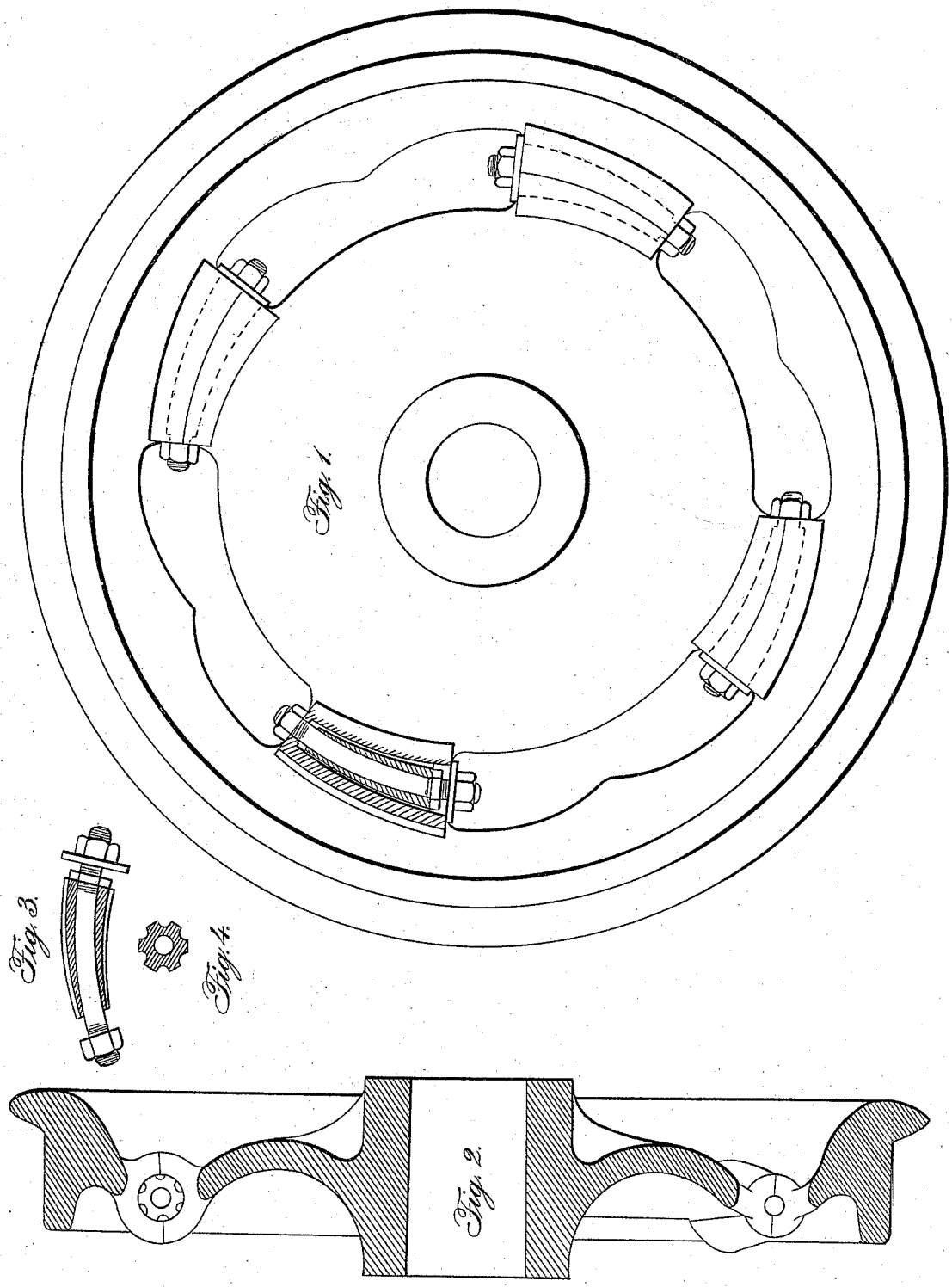

UNITED STATES PATENT OFFICE.

ABEL BREAER, OF SAUGATUCK, CONNECTICUT.

FASTENING THE DISKS AND RIMS OF CAR-WHEELS.

Specification of Letters Patent No. 10,983, dated May 30, 1854.

*To all whom it may concern:*

Be it known that I, ABEL BREAER, of Saugatuck, county of Fairfield, and State of Connecticut, have invented a certain new and useful Improvement in the Construction of Cast-Iron Disk Wheels for Railway Carriages; and I do hereby declare that the following is a full, clear, and exact description of the nature and application of the same, reference being had to the annexed drawings, which form a part of this specification, and in which—

Figure 1 is a side elevation and Fig. 2 a transverse section of a cast iron, chilled tread, single disk railway wheel, containing the improvement claimed. Figs. 3 and 4 show an essential part of the improvement which will be fully described hereafter.

The object of my improvement is to provide for renewing the rim of the wheel, or the part technically known as the "tread" thereof, and without the removal or waste of the central portion, embracing the hub, and a part of the disk connecting the hub with the rim.

Figure 1 shows a wheel of which the rim and hub are separate parts, but held in place by bolts lying parallel with a plane perpendicular to the axis of the wheel. Fig. 2 shows the same in section. Figs. 3 and 4 are the holding bolts.

The latter may themselves be conical, or may be incased each by a conical sheath, and being drawn by nuts in the direction of their length, between the body and rim of the wheel, they hold the latter in place by their friction of contact.

The outer edge of the body of the wheel is recessed to the shape and for half the diameter of the conical sheaths, the inner edge of the rim being also recessed to correspond, so that the tire cannot, while the bolts are in their places, slip off from the body or central portion of the wheel. The bolts are drawn lengthwise by a nut on each, pressing against the end of the socket which is formed one half on the body, and one half on the rim of the wheel, for the reception of the bolt and conical sheath. It will be thus seen that as the nuts are tightened the same effect is had as if the body of the wheel was expanded to the inner diameter of the rim. The smaller ends of two contiguous bolts are turned toward each other, the larger end of one being placed toward the larger end of the next, so that in no case, with an even number of bolts, does the small end of one bolt stand immediately next to the large end of another. This arrangement is made to facilitate the adjustment of the bolts in such manner as to keep the rim of the wheel concentric with the axis.

As the conical sheaths around the bolts tend, when drawn forward by the nuts, to press alike in all directions, the sheaths are channeled or grooved with an even number, (as six) of longitudinal grooves, plainly shown in the sections Figs. 3 and 4. Two of these are placed so as to be against the openings between the rim and body of the wheel. By this means the pressure caused by the tightening of the nuts is reserved principally in the direction required for securing the rim.

To secure the rim to the body of the wheel by my improvement, the former has only to be placed around the latter; the bolts, incased in their conical sheaths, to be inserted as described and the nuts drawn to a firm bearing, and regulated so as to keep the rim concentric with the axis. To renew a rim, or "tread," the bolts have only to be removed when the rim readily comes off, and a new one can be applied in the same manner as the first one.

The central body of the wheel may have a pair of lugs, or ears, in place of each single socket, the lugs projecting radially from the edge of the central body, and being separated from each other sufficiently to allow of the entrance of a third lug projecting inwardly from the rim. The three separate lugs thus interlocked in the manner of a dovetail joint, they may be secured by a bolt and conical sheath, of the kind already described; and which can be passed through so as to draw the separate portions of the wheel together, instead of tending to force them apart. Whichever method may be adopted, it is seen that the fastening of the parts of the wheel is by conical bolts, or sheaths, lying parallel with a plane which is perpendicular to the axis of the wheel.

It will be seen from my description that I do not rely upon the use of radial bolts; the bolts used in my wheel being placed in the direction of a circular arc, described from the center of the wheel. Radial bolts have been used in some cases to "set out" the tires from the bodies of railway wheels.

Although the drawings annexed show only the application of this mode of fastening to single disk wheels, it can be applied equally as well to double disk wheels, only a slight change in the form of the plates being necessary.

Having thus set forth the nature of my improvement, I do not claim, for confining cast iron wheel rims to disk centers, the use of bolts radial to the center of the wheel, nor bolts whose direction is parallel to the axis of the wheel; but I do claim for confining cast iron wheel rims to single or double disk bodies or centers—.

The use of bolts whose direction is parallel with a plane perpendicular to the axis of the wheel, and whose direction is also in the course of circular arcs, described from the center of the wheel; the bolts being either conical in form, or incased by conical sheaths to facilitate such adjustments as shall secure the parts firmly together; all substantially in the nanner and for the purpose herein set forth.

ABEL BREAER.

Witnesses:
 ZERAH COLBURN,
 SIDNEY G. MILLER.